(12) United States Patent
Engelhardt

(10) Patent No.: US 7,746,470 B2
(45) Date of Patent: Jun. 29, 2010

(54) OPTICAL SCANNING DEVICE AND METHOD OF DERIVING SAME

(75) Inventor: Johann Engelhardt, Bad Schönborn (DE)

(73) Assignee: Deutsches Krebsforschungszentrum Stiftung des Offentlichen Rechts, Heidelberg (DE)

( * ) Notice: Subject to any disclaimer, the term of this patent is extended or adjusted under 35 U.S.C. 154(b) by 128 days.

(21) Appl. No.: 11/910,938

(22) PCT Filed: Mar. 31, 2006

(86) PCT No.: PCT/EP2006/002979

§ 371 (c)(1),
(2), (4) Date: Nov. 29, 2007

(87) PCT Pub. No.: WO2006/108526

PCT Pub. Date: Oct. 19, 2006

(65) Prior Publication Data

US 2008/0165358 A1    Jul. 10, 2008

(30) Foreign Application Priority Data

Apr. 8, 2005    (EP)    ................................ 05007798

(51) Int. Cl.
*G01J 4/00*    (2006.01)
(52) U.S. Cl. .................................................. 356/365
(58) Field of Classification Search ................. 356/365
See application file for complete search history.

(56) References Cited

U.S. PATENT DOCUMENTS

| 4,268,871 | A | * | 5/1981 | Kawamura | ................. 347/251 |
| 5,037,202 | A | * | 8/1991 | Batchelder et al. | .......... 356/336 |
| 5,710,631 | A | * | 1/1998 | Bou-Ghannam et al. | .... 356/495 |
| 6,219,179 | B1 | | 4/2001 | Nielsen et al. | |
| 6,392,752 | B1 | | 5/2002 | Johnson | |
| 6,831,780 | B2 | * | 12/2004 | Knebel | ....................... 359/385 |
| 2001/0012151 | A1 | * | 8/2001 | Knebel | ....................... 359/368 |

FOREIGN PATENT DOCUMENTS

FR    2 814 247 A    3/2002

OTHER PUBLICATIONS

International Search Report; PCT/EP2006/002979 mailed Jun. 16, 2006.
Egner A et al.: "Time multiplexing and parallelization in multifocal multiphoton microscopy", cited in the application abstract and Journal of the Optical Society of America A (Optics, Image Science and Vision) J. Opt. Soc. America USA, vol. 17, No. 7, Jul. 31, 2000, pp. 1192-1201.

* cited by examiner

*Primary Examiner*—Roy Punnoose
(74) *Attorney, Agent, or Firm*—Howrey LLP; Domenico Ippolito; Viola T. Kung

(57) ABSTRACT

The present invention relates to an optical scanning device that comprises a light source to emit a beam of light, and a beam splitter to split that beam into several beamlets, and further a first objective lens to direct said beamlets onto a focal plane wherein each of said beamlets impinges on the focal plane spacially separated from each other, wherein the beam splitter comprises several birefringent elements for splitting said beam, preferably a stack of Wollaston prisms.

18 Claims, 3 Drawing Sheets

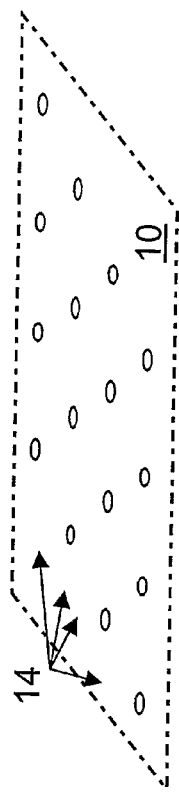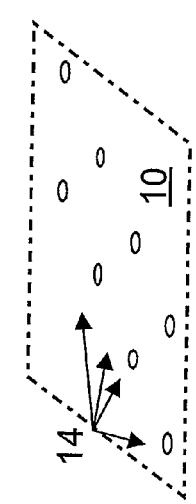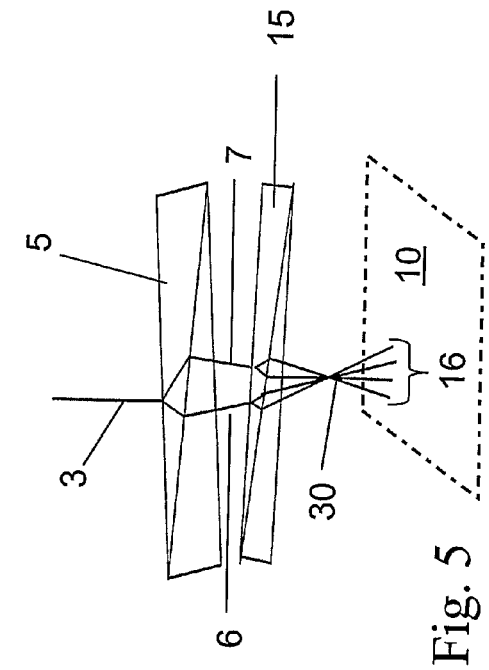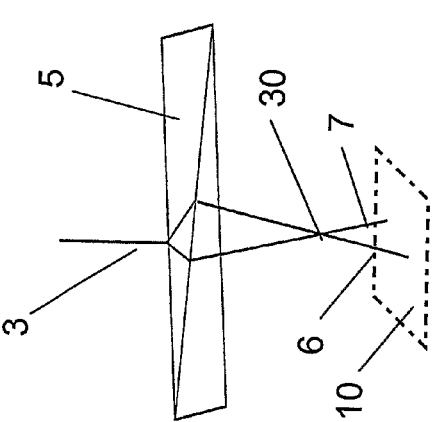

OPTICAL SCANNING DEVICE AND METHOD OF DERIVING SAME

This application is a National Stage of International Application PCT/EP2006/002979, filed Mar. 31, 2006, published Oct. 19, 2006, which claims the priority of European Application No. 05007798.1, filed Apr. 8, 2005.

BACKGROUND OF THE INVENTION

1. Field of the Invention

The present invention relates generally to optical scanning devices, and more particularly, to multi-photon fluorescence microscopes.

2. Related Art

Optical scanning devices, e.g. laser scanning microscopes are used to scan samples multi-dimensionally by directing a beam of light over the sample's surface to obtain a multi- (two- or three-) dimensional view.

If fast effects, e.g. structural re-arrangements or chemical reactions, are to be measured, the scanning must be correspondingly fast. A faster scanning can be achieved by moving the beam faster across the surface.

In most cases one cannot compensate for that by simply increasing the illumination intensity since this increasingly leads to saturation of the fluorescence dye, to stronger bleaching or even worse to damaging processes in the sample. This is also true for multi-photon fluorescence microscopes. Here the fluorescent molecules, e.g. GFP, of an object/sample are excited by the high intensity of a short pulse laser so that two photons (typically in the near infrared) are absorbed simultaneously to reach the excitation band of the fluorescence molecule in the green or blue range. A specific advantage of the multi-photon fluorescence excitation is that it is less phototoxic and has larger penetration depth due to the longer wavelength of the red light, as opposed to short-wave/blue light. Unfortunately the so-called two-photon effect is a rather weak interaction that produces relatively few fluorescence photons compared to the single photon excitation. Thus, in order to get a reasonable signal-to-noise ratio, a longer measurement period or higher excitation intensity would be needed. One way to limit or shorten this measurement period without a damaging increase in the light intensity is to use multiple beams simultaneously with intensities below the detrimental thresholds. The generation of multiple secondary beams (beamlets) out of the primary beam can be done by arrays of micro-lenses. These beamlets then simultanously scan different parts of the object, thus reducing overall measurement time roughly by the number of beamlets. An array of micro-lenses is described in A. Egner, S. Jacobs, S. W. Hell: "Fast 100-nm resolution three-dimensional microscope reveals structural plasticity of mitochondria in live yeast" pp. 3370-3375, PNAS, 19 Mar. 2002, vol. 99 no. 6, or: A. Egner et al.: Time multiplexing and parallelization in multifical multiphoton microscopy", J. Opt. Soc. Am. A/Vol. 17, No. 7/July 2000.

Another way to split the primary beam into multiple beamlets is to use multiple beam splitters and mirrors, as e.g. described in DE 199 04 592 C2.

With both above mentioned beam splitting methods it is difficult to get beamlets of equal intensity and quality, particularly for several wave lengths. For example, the arrays of micro-lenses show significant aberration errors and production tolerances, esp. with respect to the focus lengths. Additionally, the motorisation required to move the lenses causes mechanical vibration effects in the instrument disturbing the microscopic imaging, especially at high resolutions.

FR 2 814 247 shows a confocal laser microscope that can be especially applied to fluorescent measurements in biological samples. To speed up the measurement process, the collimated laser-beam can by divided into multiple beams of different directions by means of birefringent prisms.

In a fundamentally different microscope technique a non focussed wide field beam is split up into two slightly inclined beams by a Wollaston prism in order to generate the so-called Nomarski Interference Contrast or Differential Interference Contrast (DIC). This technique allows to turn a microscopic phase object optically into an amplitude object, so that a visual contrast is generated. Here the two beams are displaced in the focus by a fraction of the optical resolution with respect to each other. With displacements larger than the optical resolution the interference and thus the contrast vanishes.

US 2001/0012151 A1 shows a microscope assemblage, in particular for confocal scanning microscopy, having a light source for illuminating a specimen to be examined and at least one fluorescent-light detector for the detection of fluorescent light generated in the specimen and at least one transmitted-light detector for the detection of transmitted light passing through the specimen. The microscope is configured such that the fluorescent-light and transmitted-light detected are arranged in such a way as to make possible simultaneous detection of fluorescent and transmitted light. This microscope can be used in particular for interference contrast microscope. For this purpose a first polarisation device could be arranged between the light source and the specimen, preferably before the objective, and a second polarisation device after the specimen, preferably after the condenser. The polarisation devices could be constituted by prisms, wherein in this context Wollaston prisms are particularly suitable.

U.S. Pat. No. 6,392,752 B1 shows a device for phase-measuring microlens microscopy, wherein a scanning microlens array functions in a manner analogous to an array of interference microscopes to provide phase-sensitive, confocal micro-imaging capability. Moreover, the scanning mechanism can effectively perform a phase-modulation function. In this mode of operation, each image point is scanned by multiple microlenses that have fixed, but different, built-in phase offsets, and the combination of signal acquired from the multiple scans effectively simulate a phase-modulated interference signal. The scanning confocal microlens array can be adapted to provide phase-measuring capability by equipping each microlens with a beam-splitting mechanism that separates the illumination on the microlens into two beams, at least one of which is focused onto and reflect off an inspection sample. The two beams are coherently recombined by the beam-splitting mechanism and are projected onto an element of a detector array, wherein each detector element senses radiation from a particular corresponding microlens. The sample is scanned laterally across the focal point array to build up a synthesised, two-dimensional image of the sample surface.

Prisms, including the Wollaston prism are, e.g., described in Naumann/Schröder: "Bauelemente der optik", 6$^{th}$ ed., pp. 504-509.

It is an object of the present invention to provide an optical device and a respective method that show improved beamlet characteristics and thus fast imaging at high fidelity and easier interpretation of data.

The object is solved by an optical scanning device with the features of claim 1. Advantageous scanning devices are given in the subclaims.

SUMMARY OF THE INVENTION

A feature of the present invention is an optical scanning device that includes a beam splitter that comprises at least one birefringent element, e.g. such as calcite or quartz prism.

The macroscopic birefringent elements can be reproduced using established standard processing techniques of optical elements such as prisms at very low production tolerances in contrast to, for example, micro-arrays of lenses. Therefore, an instrument engaging such elements for beam splitting can collect data at higher fidelity and requires less or no data corrections.

The use of one birefringent element splits the primary polarized beam into two beamlets. Equal intensities of the two generated beamlets are achieved by simply rotating the element in the optical axis with respect to the incident beam polarisation. The sequential use of more than one birefringent element, in a 'cascade', leads to the splitting of the beamlets into further beamlets, typically to the power of two, e.g. original beam-2 beamlets-4 beamlets-8 beamlets, and so on.

Preferrably the birefringent element is a polarizing prism system, typically made of sections with different optical characteristics, such as Nicol, Glan-Thompson, Glan-Taylor, Ahrens, Rochon, Sénarmont, and/or Wollaston prisms/polarisation beam splitters or acousto-optical devices such as AOM (acousto optical modulators), AOD (ao deflectors), AOTF (ao tunable filters), AOBS (ao beam splitters) etc. The usage of acousto-optical devices allows programmable beam separation and color selection by generating appropriate soundwaves in the device. But this is more complex and expensive. For clarity of the following descriptions the simpler most preferred embodiment is taken.

It is a preferred embodiment to use one or more Wollaston prisms to split the original beam into several beams. The Wollaston prism has the advantage that the beams can be split symmetrically at nearly the same angles.

It is particularly preferred to use a stack of two or more Wollaston prisms generating a plurality of beams. These than scan simultaneously the sample, speeding up the acquisition process.

At a first glance it is surprising that multiple prisms can be used in a row to generate a plurality of beams with exactly the same intensity although the prisms change the polarisation of the beam. The reason behind that is that in some prisms, such as the Wollaston type, the splitting of the incoming beam results in two beams with exactly orthogonal polarisations. If Wollaston prisms are used the incoming beam polarisation is at 45° with respect to the exiting beam polarisations. So the next prism in a row can be rotated around the optical axis to simultaneously correct for all incoming beams to produce again equal intensities at the exiting beams, i.e., that again the incoming beam polarisation is at 45° with respect to the exiting beam polarisations.

The adjustment for equal intensities of the beamlets is easily achieved if the prisms are mounted in rotatable elements stacked on top of each other.

With such a simple arrangement the prisms and therewith the intensity of the beamlets can be easily adjusted by rotating the stacked discs with respect to each other, i. e. around their common central axis. This leads to a relatively simple procedure to, e.g., adjust the intensities of the beamlets.

In contrast to the DIC Microscope, where the beams must be displaced in the focus by less than the dimension of the optical resolution in order to enable the beams to interfere with each other, in the present invention it is mandatory to separate the beams by a large enough amount so that the interference of the separated beams becomes negligible. In a standard optical microscope environment each Wollaston prism splits the beam into two beams with an angle in the order of about 10 to 30 arc minutes for the present invention. This is about ten times larger than the value typically used for the differential interference contrast.

Actually the optical scanning of the multiple beams works automatically simultaneous when the primary beam is scanned in the conventional way using scanners such as galvanometers or other devices, since after the splitting into the multiple beams the whole generated array of beams scans across the sample in the same way in which the single beam would have done.

The optical scanning device can work such that as a first step a light source emits a beam of light, e.g. red laser light of a wavelength of about 870 nm. This original light beam then passes the at least one birefringent element, preferably the stack of Wollaston prisms, and splits into a plurality of beamlets. The beamlets then pass a first objective lens to be directed onto a focal plane, e.g. at the location of the sample to be measured. The beamlets may then be directed to a detection means, e. g. a light detector (CCD or such) or the human eye. The beamlets each impinge on the focal plane separately to measure/scan different areas of a sample, thus reducing the overall measurement time. Interference effects between neighbouring beams, required in the Nomarski contrast technique must therefore be avoided. This can preferably be achieved by keeping a distance of at least one wavelength. To avoid interference effects, it is preferred that the distance is at least 5 wavelengths, in particular between 5 and 10 wavelengths, preferably about 5 to 7 wavelengths, and especially exactly 5 wavelengths between adjacent beamlets.

Preferably, there may be provided a second objective lens that is capable to direct the beamlets from the focal plane to a detection means.

Preferably, there is further provided a scanner between the light source and the birefringent element.

In another aspect of the present invention, the above mentioned optical scanning device is part of a multi-photon fluorescence microscope, in particular of the 4 Pi type. The 4 Pi type uses the 2-photon effect to reduce the secondary maxima of the point-spread function.

The invention is not restricted to a particular kind of scanning devices but may, for example, also be used with a simple fluorescence application, e.g. a fluorescence microscope, to reduce the effect of saturation caused by high light intensities.

In even another aspect of the present invention, the above mentioned optical scanning device is part of a scanner for arrays of micro-samples, particularly for DNA-microarrays.

Preferably, the light source is a laser emitting a laser beam of long wavelengths, e.g. red light of 870 nm wavelength.

Preferably, the laser is a short-puls laser, e.g. a TiSa laser.

Preferably, the detection means is a camera, in particular a CCD camera, that is preferably illuminated via a dichroic beam splitter.

The laser can also be of a kind that emits a beam that contains several wavelengths.

The Wollaston prisms can be chosen according to their desired properties by varying, e.g. the materials, angles, and thicknesses etc.

Preferably the prisms are placed into the illumination beam at or close to an image of the pupil of the micro-objective.

BRIEF DESCRIPTION OF THE DRAWINGS/FIGURES

The present invention is described with reference to the accompanying drawings. In the drawings, like reference numbers indicate identical or functionally similar elements.

FIGS. 3a to 3e show the beam distribution of the original beam and beamlets after passing several Wollaston prisms.

FIG. 4 shows the path of rays of a light beam using one Wollaston prism.

FIG. 5 shows the path of rays of a light beam using two Wollaston prisms.

DETAILED DESCRIPTION OF THE INVENTION

The invention is now described with reference to several figures. It should be understood, however, that the invention is not limited to this description but is defined by the claims.

Figure 1:
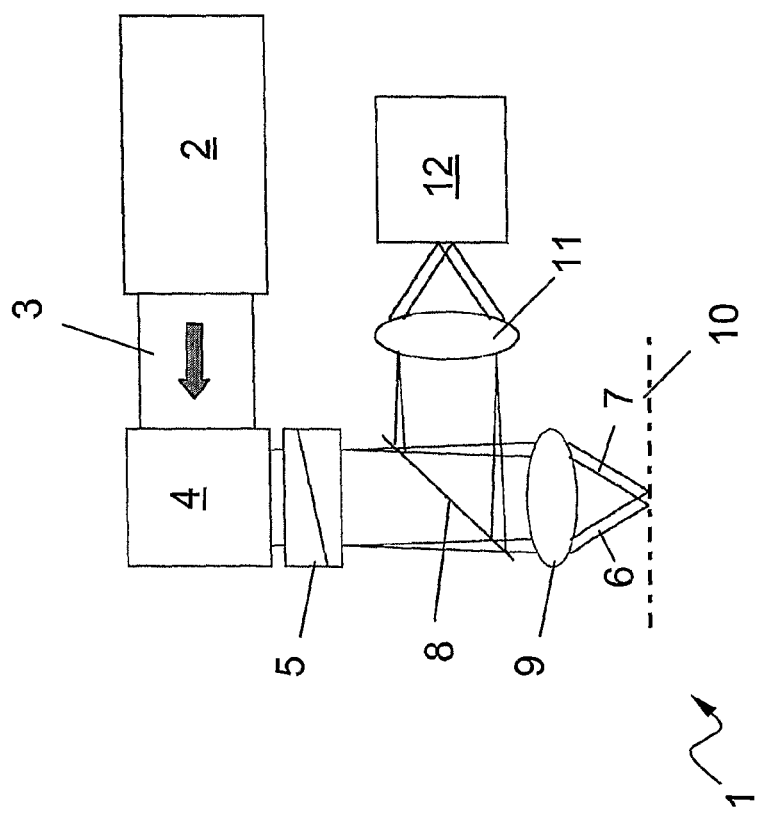
FIG. 1 is a simplified schematic diagram of a laser scanning device using several beamlets.

FIG. 1 is a simplified schematic diagram of a laser scanning device 1 using several beamlets.

The laser scanning device 1 comprises a laser 2 as a light source to emit a laser beam 3, as indicated by the arrow. the laser beam 3 enters a scanner 4 that moves the laser beam 3, e.g. in lines, to generate a scanning area. The laser beam 3 then enters a beam splitter 5 that splits the primary laser beam 3 into several, here: two, beamlets 6,7. The beamlets 6,7 then pass a dicroic mirror 8 that is at least semi-transparent for the Laser light. The beamlets 6,7 then pass a first objective lens 9 to direct the beamlets 6,7 onto a focal plane 10 wherein each of said beamlets 6,7 impinges on the focal plane 10 at locations separated from each other, i. e. without significant interference. The beamlets 6,7 or light generated in the sample by the illumination beamlets go back through the first lens 9 to the mirror 8 that is at least semi-reflective with respect to the detection light, and are reflected to a second objective lens 11 that focuses light generated by the beamlets 6,7 on a detection means in form of a CCD detector 12.

Instead of this arrangement, the laser beam 3 may be arranged to pass the focal plane 10 instead of being reflected.

In one embodiment of the invention, the beam splitter 5 comprises at least one Wollaston prism, preferable a linear stack of Wollaston prisms.

Figure 2:
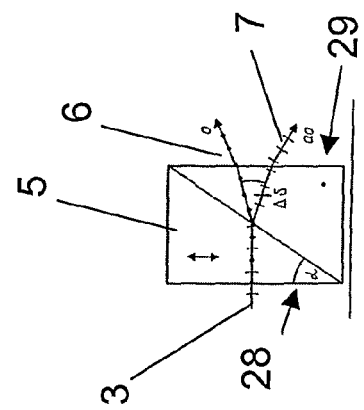
FIG. 2 is a schematic diagram of a Wollaston prism.

FIG. 2 is a schematic diagram of a Wollaston prism from Naumann/Schröder: "Bauelemente der Optik", 6$^{th}$ ed., p. 506. The beam of light 3 enters the Wollaston prism 5 from the left, and is split up into two beamlets 6,7 with orthogonal polarisation. The angle $\Delta\delta$ is dependent on the material (e.g. quartz or calcite), the angle $\alpha$, and the wavelength of the beam 3.

The Wollaston prism comprises an entrance surface 28 and an exit surface 29 which are parallel to each other. Thus the Wollaston prism behaves essentially optically neutral with regard to optical imaging which is advantageous for the present invention.

FIGS. 3a to 3e illustrate the location of light spots of beamlets within the focal plane 10 from an inclined view.

FIG. 3a shows a circular light spot 13 in the focal plane 10 that originates from the primary laser beam 3 if no beam splitter 5 is in the path of light. The arrow indicates the polarisation.

FIG. 3b shows the location of two light spots 14 generated by beamlets 6,7 in the focal plane 10 wherein the beamlets 6,7 have been created using the Wollaston prism 5 from FIG. 4. The orthogonal polarisation is indicated by the arrows.

FIGS. 3c, 3d, and 3e show the location of light spots in the focal plane 10 similar to FIGS. 3a and 3b using a stack/cascade of 2, 3, and 4 Wollaston prisms 5, resp. The configuration of prisms 5,15 creating a pattern like that shown in FIG. 3c can be seen, for example, in FIG. 5.

FIG. 4 shows a schematic side view of a beam of light 3 passing a Wollaston prism 5 to impinge on a focal plane 10. The first laser beam 3 passes the Wollaston prism 5 from above and is split into two beamlets 6,7. In this configuration, the beamlets 6,7 cross at a crossing point 30. The two beamlets 6,7 impinging on the focal plane 10 show a pattern like that illustrated in FIG. 3b.

FIG. 5 shows a schematic side view of a beam of light 3 passing two Wollaston prisms 5,15. Thus, each beamlet 6,7 emerging from the first Wollaston prism 5 is again split into two. The emerging four beamlets 16 are crossing in a common crossing point 30 and impinge then on the focal plane 10 in a pattern like that illustrated in FIG. 3c.

The Wollaston prisms 5 are each part of a stack element (not shown) each consisting of a disc or plate, preferably made of aluminium. The stack elements that are rotatably arranged on top of each other. Each disc or plate has a central hole or bore wherein there is provided the respective Wollaston prism 5,15.

The laser scanning device described above by reference to the FIGS. 1 to 5 can be part of a laser scanning microscope. In such a laser scanning microscope the crossing points 30 of the beamlets 6,7,16 are preferably arranged in the pupil of the microscope. This is particularly advantageous if larger stacks of prisms are used.

The above described laser scanning device can also be used for scanning DNA-microarrays or similar microarrays having a substrate on which spots with probes are provided. The spots are optically scanned.

With this embodiment, laser scanners with their inherent advantages can be used also for high throughput measurements in micro array techniques, where a single beam would be too slow.

Laser scanners here can have advantages with respect to dynamic, accuracy, signal to noise ratio etc. depending from the arrangement. Pulsed lasers could be engaged combined with time gated CCDs for high throughput lifetime measurements. This in turn allows more accurate FRET (fluorescence resonance energy transfer) measurements for example in binding studies. Two-Photon excitation with its inherent depth discrimination, and less auto-fluorescence can be applied. Of course also multiply stained samples can be imaged using appropriate laser lines and filters and optionally multiple cameras. The usage of the different polarisation of the beamlets also might be advantageously exploited if the interaction with the sample is polarisation sensitive. In these applications with micro arrays it can be advantageous not to focus the beamlets exactly onto the spots so that they cover the whole spot and/or are registered with the spots. Especially in this case the signal to noise ratio can be improved as spaces in between the spots are not illuminated.

This is just to name a few of the techniques applied in these quantitative measurements on micro arrays.

Figure 6:
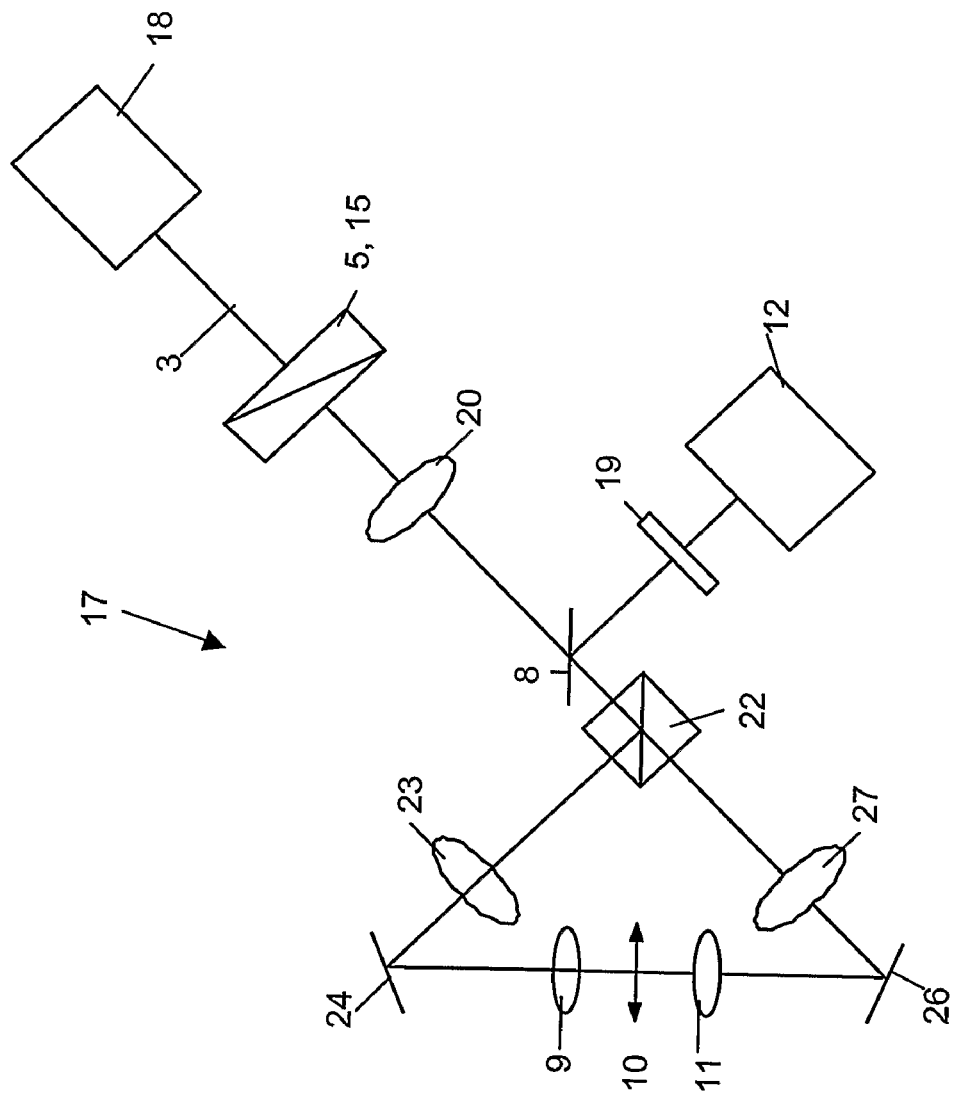
FIG. 6 illustrates a 4 Pi multi-photon fluorescence microscope.

FIG. 6 shows a 4 Pi laser scanning module 17 in a schematic diagram. This module is typically run in multi-photon fluorescence mode. In a 4 Pi microscope the objective turret and stage is replaced by the 4 Pi module 17.

A beam 3 from the laser scanner 18 enters the 4 Pi module and is split into beamlets by a beam splitter 5,15. The beam consisting now of several beamlets is directed by mirrors 24,26 onto a sample simultaneously from top and bottom via two beam paths through two opposing micro-objectives 9 and 11. The sample is placed in a focal plane 10. A beamsplitter 22 (beam splitting mirror) splits the set of beamlets into two essential identical sets of beamlets. Lens pairs 20, 23 and 20, 27 are provided for translating the pupil of the micro objectives 9 and 11 to essentially the location where the beamsplitter 5,15 is.

Light generated in the focus of the sample is collected by the micro-objectives 9,11 and merged at the beamsplitter 22 and directed by means of a dicroic mirror 8 to a detector 12 (ccd sensor) on which the light is focussed. In the fluorescence case an appropriate barrier filter 19 is positioned in front of the detector 12 for blocking the excitation light.

The beam splitter 5,15 of this embodiment is fashioned in the same way as the beam splitter described above by reference to the FIGS. 2 to 5.

With such a laser scanning multi-photon fluorescence microscope several points of the probe can be scanned simultaneously, so that even by using the so called two-photon effect a good signal-two-noise ratio can be achieved at short acquisition times without increasing the local light intensity. The measurement signals are very accurate as the beamlets are adjusted to the same light intensity.

The invention can be summarised according to the following:

The present invention relates to an optical scanning device that comprises a light source to emit a beam of light, and a beam splitter to split that beam into several beamlets, and further a first objective lens to direct said beamlets onto a focal plane wherein each of said beamlets impinges on the focal plane separated from each other, wherein the beam splitter comprises at least one birefringent element, preferably a stack of Wollaston prisms which then allows faster imaging by simulateously using multiple beams.

REFERENCE SIGNS 1 laser scanning device
2 laser
3 laser beam
4 scanner
5 beam splitter
6 beamlet
7 beamlet
8 mirror
9 first objective lens
10 focal plane
11 second objective lens
12 CCD detector
13 light spot of primary beam (3)
14 light spots of beamlets (6,7)
15 second Wollaston prism
16 beamlets
17 4 Pi module
18 laser scanner
19 barrier filter
20 first intermediate lens
21
22 beam splitting mirror
23 second intermediate lens
24 refractive mirror
25
26 refractive mirror
27 third intermediate lens
28 entrance surface
29 exit surface
30 crossing point

The invention claimed is:

1. An optical scanning device, comprising:
a light source (2) to emit a beam of light (3);
a beam splitter (5, 15) to split said beam coming from the light source (2) into several beamlets (6, 7, 16);
a first objective lens (9) to focus said beamlets (6, 7, 16) onto a focal plane (10) wherein at least two of said beamlets (6, 7, 16) impinge on the focal plane (10) spatially separated from each other; and
a second objective lens (11) to direct light generated in the focal plane (10) by said beamlets (6, 7, 16) to a detection means (12);
wherein the beam splitter comprises several birefringent elements (5, 15) for splitting said beam coming from said light source (2) into said several beamlets (6, 7, 16); and
the interference of said beamlets (6, 7, 16) at the time of detection is negligible.

2. The optical scanning device of claim 1, wherein the birefringent elements (5, 15) are arranged in a sequential order.

3. The optical scanning device of claim 1, wherein the birefringent elements (5, 15) comprise a polarizing prism system.

4. The optical scanning device of claim 1, wherein the birefringent elements (5, 15) comprise at least one Wollaston prism (5, 15).

5. The optical scanning device of claim 4, wherein the birefringent elements (5, 15) comprise several Wollaston prisms (5, 15).

6. The optical scanning device of claim 1, further comprising a scanner (4) between the light source and the bifringence element (5, 15).

7. The optical scanning device of claim 1, wherein the distance between at least one pair of beamlets (6, 7, 16) in the focal plane (10) is at least 5 wavelengths.

8. The optical scanning device of claim 1, wherein at least one birefringent element is an acousto-optical device.

9. The optical scanning device of claim 1, wherein said beamlets (6, 7, 16) impinge on the focal plane (10) spatially separated from each other so that the interference of the separated beams becomes negligible.

10. The optical scanning device of claim 1, wherein the energy of the beam of light (3) is calibrated for multi-photon fluorescence.

11. The optical scanning device of claim 1, wherein the focal plane comprises an array of micro-samples.

12. An optical scanning device, comprising:
a light source (2) to emit a beam of light (3);
a beam splitter (5, 15) to split said beam coming from the light source (2) into several beamlets (6, 7, 16); and
a first objective lens (9) to focus said beamlets (6, 7, 16) onto a focal plane (10) wherein at least two of said beamlets (6, 7, 16) impinge on the focal plane (10) spatially separated from each other;
wherein the beam splitter comprises several birefringent elements (5, 15) for splitting said beam coming from said light source (2) into said several beamlets (6, 7, 16); and the birefringent elements (5, 15) are axially rotatable with respect to each other.

13. An optical scanning device, comprising:

a light source (2) to emit a beam of light (3);

a beam splitter (5, 15) to split said beam coming from the light source (2) into several beamlets (6, 7, 16); and a first objective lens (9) to focus said beamlets (6, 7, 16) onto a focal plane (10) wherein at least two of said beamlets (6, 7, 16) impinge on the focal plane (10) spatially separated from each other;

wherein the beam splitter comprises several birefringent elements (5, 15) for splitting said beam coming from said light source (2) into said several beamlets (6, 7, 16);

the birefringent elements (5, 15) comprise several Wollaston prisms (5, 15); and the several Wollaston prisms (5, 15) are arranged as a linear stack of several stack elements that are axially rotatable with respect to each other.

14. The optical scanning device of claim 13, wherein the stack elements each consist of a disc of aluminium with a central hole wherein the respective Wollaston prism (5, 15) is provided.

15. An optical scanning method, comprising the steps of:

(a) activating a light source to emit a beam of light;

(b) splitting said beam of light into several beamlets by said beam passing through several birefringent elements;

(c) letting said beamlets pass a first objective lens to direct said beamlets onto a focal plane wherein each of said beamlets impinges on the focal plane spatially separated from each other; and (d) directing said beamlets to a detection means, wherein the interference of said beamlets at the time of detection is negligible.

16. The optical scanning method of claim 15, further comprising the step of directing the light beam from the light source to the birefringent elements via a scanner.

17. The optical scanning method of claim 15, wherein the step of splitting said beam of light into several beamlets comprises the passing of several stacked Wollaston prisms.

18. A method for adjusting the intensities in an optical scanning device comprising a light source (2) to emit a beam of light (3);

a beam splitter (5, 15) to split said beam coming from the light source (2) into several beamlets (6, 7, 16); and a first objective lens (9) to focus said beamlets (6, 7, 16) onto a focal plane (10) wherein at least two of said beamlets (6, 7, 16) impinge on the focal plane (10) spatially separated from each other;

wherein the beam splitter comprises several birefringent elements (5, 15) for splitting said beam coming from said light source (2) into said several beamlets (6, 7, 16);

comprising the step of axially rotating at least one of the birefringent elements with respect to the polarisation of the light.

* * * * *